Mar. 13, 1923.

J. J. FABER

FILM PACK HOLDER FOR CAMERAS

Filed Feb. 27, 1922

Inventor
John J. Faber
By Watson E. Coleman
Attorney

Mar. 13, 1923.

J. J. FABER 1,447,972

FILM PACK HOLDER FOR CAMERAS

Filed Feb. 27, 1922    2 sheets-sheet 2

Inventor

John J. Faber

By Watson E. Coleman
Attorney

Patented Mar. 13, 1923.

1,447,972

UNITED STATES PATENT OFFICE.

JOHN J. FABER, OF MINNEAPOLIS, MINNESOTA.

FILM-PACK HOLDER FOR CAMERAS.

Application filed February 27, 1922. Serial No. 539,538.

*To all whom it may concern:*

Be it known that I, JOHN J. FABER, a citizen of the United States, residing at Minneapolis, in the county of Hennepin and State of Minnesota, have invented certain new and useful Improvements in Film-Pack Holders for Cameras, of which the following is a specification, reference being had to the accompanying drawings.

This invention relates to devices for holding and supporting film packs within a camera, and the object of the invention is to provide a holder of this character with means whereby a film pack of a less size may be properly supported within a holder designed for relatively larger sized film packs.

A further object is to provide means whereby the film pack may be held firmly in place against any shifting of the film pack and permit the usual manipulation of the film pack incident to taking photographs.

A still further object is to provide an adapter, as it may be termed, which is capable of use with the ordinary film pack holder.

Other objects will appear in the course of the following description.

My invention is illustrated in the accompanying drawings, wherein:—

Figure 1:
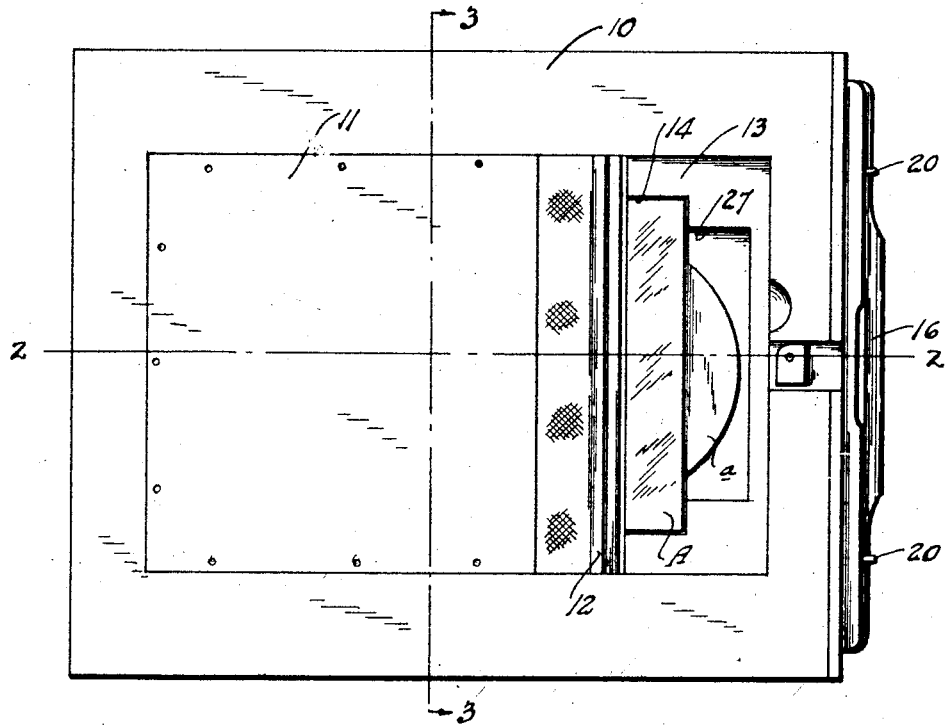
Figure 1 is a rear elevation of my improved film pack holder.
Figure 2:
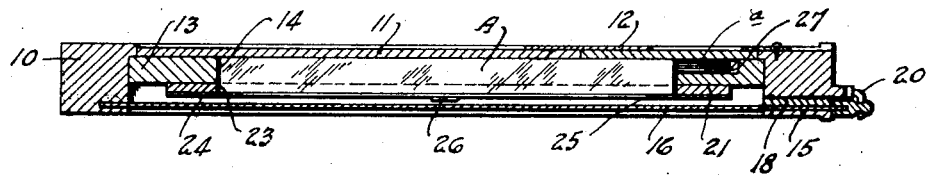
Figure 2 is a longitudinal section on the line 2—2 of Figure 1.
Figure 3:
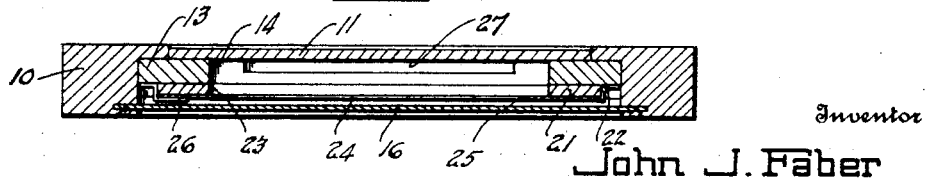
Figure 3 is a transverse section on the line 3—3 of Figure 1.
Figure 4:
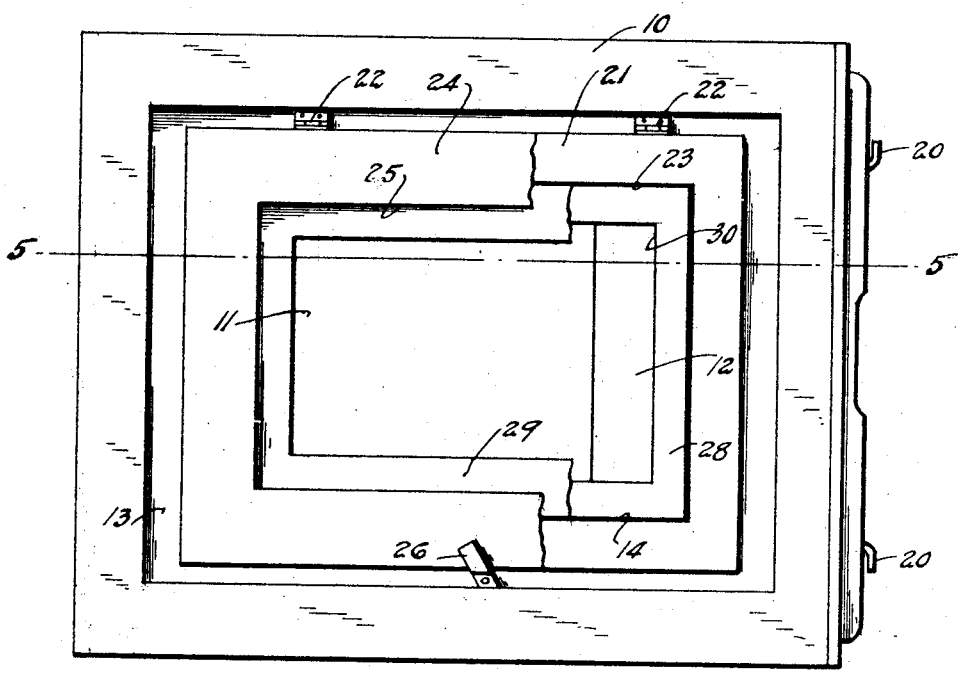
Figure 4 is an elevation of the front of the holder, the sliding screen being removed and certain of the parts being broken away.
Figure 5:
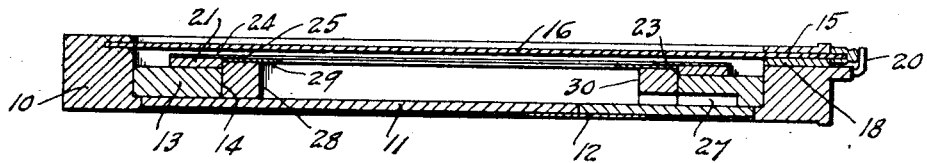
Figure 5 is a section on the line 5—5 of Figure 4 but showing the sliding screen 16 in place.

Referring to these drawings, 10 designates the body of the holder, which is illustrated as rectangular in form, and which may be constructed in any suitable manner and is provided with the back 11, one section of which is hinged, as at 12, to permit the tabs on the film pack being manipulated in the usual manner. Inward of this back there is provided a film pack supporting frame 13 which has a thickness equal to the thickness of the film pack and has a central opening 14 rectangular in form and of the proper size to receive the ordinary film pack A for which the holder is normally designed. The film pack when in place rests upon the back 11 and its face is approximately flush with the face of the portion 13. The end of the holder 10 is slotted, as at 15, for the admission of the usual slide 16 which has tight engagement in grooves 17 in the usual manner, one wall of the slot 15 being formed by a felt layer 18. The slide is normally held closed by the rotatable catches 20.

Hinged to the frame 13 is a rectangular frame 21, the hinges being designated 22, this frame having a central opening 23 as large as the opening 14. Attached to the face of this frame 21 and projecting inward over the opening is a rectangular plate 24 which is attached to the frame 21 and forms part thereof and has a central opening 25 which is slightly smaller than the opening 23. This frame 21 with the plate 24 is held closed by means of a latch 26 which is pivoted to the face of the portion 13 opposite the hinges 22. The holder as above described is designed for a maximum sized film for which the camera is adapted.

The film pack A is disposed within the frame 13, the tabs of the film pack extending out through a recess 27 formed in the inside face of the frame 13 and normally closed by the hinged portion 12 of the back 11, this hinged portion 12 being held closed by a suitable latch. The films of the pack are manipulated in the usual manner by opening the door or flap 12 and pulling on the tabs attached to the respective films.

Adapted to nest within the opening 14 is a second frame 28 having a projecting face plate 29 attached thereto, the central opening 30 of this frame 28 being, of course, of a smaller size than the opening 14 of plate 13 and, therefore, adapted to receive the next smaller film pack. When this frame 28 is nested in place within the frame 13 and the film pack is put in place within the opening 30, it is obvious that the closing of the frame 21 will hold the film pack in place within the frame 28. Another smaller frame may be disposed within the frame 28, this frame being exactly of the same character as the frame 28, and, therefore, needs no further description and illustration so that a still smaller film pack may be used with the regular film pack holder. It will thus be understood that there are a series of these frames 28 designed to be disposed within the frame 13, each gradually decreasing in size so as to constitute adapters whereby any size film from the maximum to the minimum suitable for the camera may be used. I have only illustrated one of these subsidiary frames 28, as all the frames will be constructed alike in form, though, of course, of various sizes to fit one within the other.

I do not wish to be limited to the details of construction illustrated nor to the exact arrangement of the parts. The holder may be of wood or metal or a combination of both, and by its use it is possible to use various sizes of film with the one camera. This device is very simple, may be cheaply made, and requires no peculiar operation of the film.

This form of film pack holder is designed to be used in view cameras or any camera which uses dry plate having a dry plate holder. The camera can be focused on the usual ground glass, the film pack holder is put in place, then the slide 16 drawn out, the picture is taken, then the slide 16 is put back, the film pack is removed, and the tab on the film pack drawn to pull the exposed film out of its exposing position.

I claim:—

1. A film pack holder of the character described comprising a rectangular frame formed with an opening to receive the film pack, the frame having a back formed with a hinged section, the back of the frame being cut away behind this hinged section to provide a recess in which the tabs of the film pack may be disposed, a removable frame adapted to be disposed upon the first named frame and extended over the film pack, means to clamp the removable frame and the first named frame, and a slide engaging the first named frame and adapted to cover the face of the film pack.

2. A film pack holder comprising a rectangular frame having a rectangular recess upon one face, the central portion of the frame having an opening adapted to receive the film pack, a back to said frame having a hinged portion, the frame confronting the hinged portion of the back being recessed to receive the tabs of the film pack, a rectangular frame disposed within and fitting the recessed portion of the first named frame and formed to fit around the film pack and project over the face of the same, a latch adapted to hold said second named frame closed, and a slide insertable into the first named frame and over the face of the second named frame.

3. A film pack holder comprising a rectangular frame having a rectangular recess upon one face, the central portion of the frame having an opening adapted to receive the film pack, a back to said frame having a hinged portion, the frame confronting the hinged portion of the back being recessed to receive the tabs of the film pack, a rectangular frame disposed within and fitting the recessed portion of the first named frame and formed to fit around the film pack and project over the face of the same, a latch adapted to hold said second named frame closed, a slide insertible into the first named frame and over the face of the second named frame, and a rectangular frame forming the adapter adapted to be disposed within the opening of the first named frame and having a central opening to receive a film pack.

4. A film pack holder comprising a frame formed to provide a seat for the film pack, the back of the frame having a hinged section at one end, the seat for the film pack being recessed to permit the projection thereinto of the tabs on the film pack, said hinged section of the back being normally disposed over said recessed portion, and a slide having light-tight engagement with the front of the frame and normally closing the front of the frame.

In testimony whereof I hereunto affix my signature.

JOHN J. FABER.